United States Patent

[11] 3,622,970

| [72] | Inventors | Leon Sayous<br>Pau;<br>Maurice Barbier, Ousse, both of France |
|---|---|---|
| [21] | Appl. No. | 834,814 |
| [22] | Filed | June 19, 1969 |
| [45] | Patented | Nov. 23, 1971 |
| [73] | Assignee | Societe Anonyme dite Societe National des Petroles D'Aquitaine<br>Courbevoie, France |
| [32] | Priority | June 21, 1968 |
| [33] | | France |
| [31] | | 155964 |

[54] METHOD OF SEISMIC PROSPECTING
3 Claims, 10 Drawing Figs.

[52] U.S. Cl. .................................................. 340/15.5 AC
[51] Int. Cl. .......................................................... G01v 1/28
[50] Field of Search .......................................... 30/15.5, 7; 340/15.5; 181/.5

[56] References Cited
UNITED STATES PATENTS

| 3,264,606 | 8/1966 | Crook et al. | 181/.5 |
| 3,326,320 | 6/1967 | Forester | 340/15.5 |
| 3,124,781 | 3/1964 | Loper et al. | 340/7 |
| 3,259,878 | 7/1966 | Mifsud | 340/15.5 |

Primary Examiner—Rodney D. Bennett, Jr.
Assistant Examiner—N. Moskowitz
Attorney—Bacon & Thomas ABSTRACT: A method of seismic prospecting comprises transmitting into the ground a signal containing a series of discrete energy impulses of the same sign and constant amplitude in which the number of and intervals of time between the pulses are such that when the received signals are intercorrelated with a function of the transmitted signal to determine the travel time of the reflected waves the intercorrelation function of the transmitter signal has correlation residues, the amplitudes of which are less than a given fraction of the maximum amplitude of said intercorrelation function.

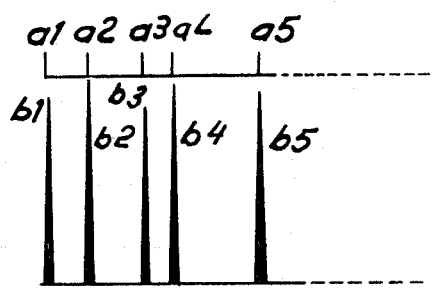
Fig. 2
Fig. 3
Fig. 4
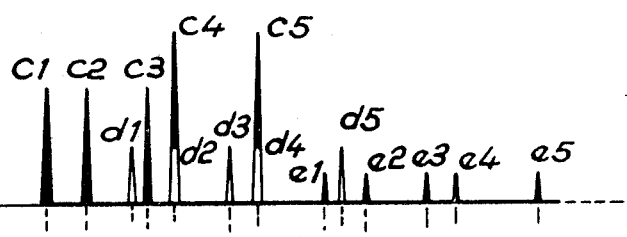
Fig. 5
Fig. 5a
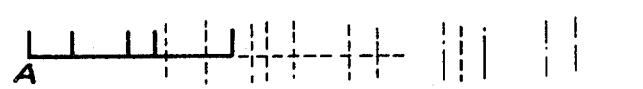
Fig. 5b
Fig. 5c
Fig. 5d
Fig. 6

METHOD OF SEISMIC PROSPECTING

The present invention relates to the exploration of an area by the transmission of energy into this area and, it relates more particularly, to geophysical prospecting by means of seismic waves. This method of prospecting, which is already much used for land exploration, is of considerable importance in marine surveying.

When an energy impulse is transmitted from a point on the surface of the earth or near this surface, which is known as the transmission point, the mechanical waves set up in the ground follow various paths and, in particular, they are reflected at the interfaces between differently constituted geophysical strata; these interfaces are called "reflectors." By using suitable pickups, such as geophones, it is possible to collect the reflected waves at one or more receiving points.

There is obtained a signal, certain component parts of which correspond to the arrival of waves reflected once by the various reflectors; measurement of the time elapsing between the moment of transmission and the arrival of these particular components provides knowledge of the depth of the reflectors, assuming that the rate of propagation of the waves in the ground is known. The other parts of the signal received at the reception point constitute what is known as "noise." This noise comprises waves set up at the point of transmission but reaching the reception point after having followed paths that are not important in calculating the depth of the strata; it also includes stray waves in the ground set up by a large number of factors unconnected with the source located at the point of transmission.

If the energy transmitted by the source at the point of transmission is sufficient, the important components of the signal received are directly detectable, their amplitudes being greater than that of the ground noise, and they cannot be confused therewith. This procedure is used in well-established prospecting techniques employing the firing of large explosive charges. These techniques are however difficult to employ; furthermore, the explosion of a charge under the sea causes a bubble of gas to be formed and this is a source of undesirable side effects.

If, on the other hand, the waves emitted are of low amplitude, the parts of the picked-up signal corresponding to the waves which have been reflected once by the various reflectors at first sight differ only slightly, or even not at all, from the ground noise.

Nevertheless, some success has been achieved in using such waves in seismic prospecting by two types of method, namely impulse methods and long signal methods.

The impulse methods are based upon the following principle: a mechanical wave is transmitted into the ground, this wave being created by a relatively string energy impulse with the help of a gas gun or a spark generator, for example; in the case of these latter the spark produced sets up electrical energy which is generally greater than 5,000 Joules and which may possibly reach and exceed 100,000 Joules. The transmission of this impulse is followed by a "listening period," accompanied by a recording, at the point of reception, for a time which is at least equal to the time taken by the wave to travel to and back again from the deepest reflector that it is desired to reach.

At the end of the listening period, a second impulse is sent, followed by a listening period of the same duration, then a third impulse and so on, and the signals received after successive listening periods are then superposed and the corresponding amplitudes of these signals are added by an operation known as "stacking." In the course of this operation, the noise components diminish in relative value, whilst the components corresponding to the impulses reflected by the various reflectors are added to each other and form more easily detectable peaks, and abscissae of which correspond to the periods of travel that it is required to determine.

It is clear that the greater the number of impulses transmitted, the more precise will be the position of the peaks of importance, but the total investigation time per point of each reflector is also longer. This constitutes a drawback in seismic marine operations, particularly where the source of the impulses and the receiver or receivers move continuously with the prospecting vessel; the mirror point of a given reflector is simultaneously displaced. In these conditions only a limited number of impulses can reach a zone of the reflector which is sufficiently narrow for it to be considered as characterizing a signal point on this reflector; the more the dip of the reflector is of importance in its effect on speed of the vessel, the greater is the limitation on this number of impulses; the quality of the final record, obtained by adding this limited number of successive signals received, suffers as a result.

It might be thought that this disadvantage could be reduced by increasing the energy of the transmitted impulses; however this involves much more complicated and expensive apparatus, the acoustic output of which generally decreases with the energy emitted.

In contrast to the impulse methods, the long signal methods involve transmitting into the ground a series of mechanical waves set up by a command signal, the duration of which is generally greater than the time taken by those waves to travel between the emitter and the receiver after being reflected on the deepest reflector to be detected; the amplitude of the waves transmitted is thus considerably less than in the impulse methods; sinusoidal mechanical waves of variable frequency can be transmitted with the help of vibrators, or trains of closely spaced impulses, the envelope of which is of variable or preselected frequency, can be sent with the help of light spark-generators adapted to operate at a high rate. Methods of this type are described, for example in French Patent Specification No. 1,112,455 (Continental Oil Co.) and 1,299,570 (Jersey Production Research).

The long signal methods offer the advantage of requiring transmitter of only relatively low power.

Furthermore, when the transmitter and the receiver are moved, as in seismic operations at sea, each long signal is no longer reflected at a single mirror point, but on a segment of the reflector. A kind of spatial integration of the responses of the reflector is thus achieved.

The periods of travel of the waves set up by a long signal, assuming a predetermined variation rate, is determined by a method of correlation between the signal received and the signal transmitted, which method is very well known to specialists and the principle of which will be briefly described.

If, in the case of seismic prospecting, for example, a source of mechanical energy is available at the transmission point, there is sent into the ground, with the help of an appropriate control signal, a series of mechanical waves, the amplitude of which is a function of time $f(t)$ and the duration of which is $T$; $g(t)$ is the rate of variation of the received and recorded signal as a function of time $t$.

The function $g(t)$ results from superimposing the "noise" on one or more functions analogous to $f(t)$, these being separated from each other in time as the result of one or more reflections of the waves emitted at the source, the functions $f(t)$ and $g(t)$ being known.

The mathematical principle of the method of correlatiing these two functions consists in multiplying, at each moment, the value of the amplitude of one by that of the other, and in integrating the result of these multiplications for each instant over the duration $T$ of the signal emitted; the result of this operation is a number. To obtain the intercorrelation or cross-correlation function of these two functions, the foregoing operation is carried out by causing a shift in time $\tau$, or by dephasing of the two signals relatively to each other, their representative functions then being $f(t)$ and $g(t-\tau)$, and this operation is repeated, varying the values for $\tau$.

The cross-correlation function of $f(t)$ and $g(t)$ over a period $T$ is:

$$k(T, \tau) = \int_0^T f(t)g(t-\tau)dt$$

For a given value of $T$, the function $k(T,\tau)$ has one or more maxima for values of $\tau_1, \tau_2, \tau_3...$ corresponding to the times taken by the waves emitted at the source to reach a reception point after being reflected on reflectors $R_1, R_2R_3$ etc.

The interesting feature of this method is that all the components of the received signal that are of uncertain origin or not related to the transmitted waves are minimized in relative value in the course of the operations of multiplication and of integration of the correlation, whereas the components corresponding directly to the transmitted waves are amplified and added for certain values of the dephasing $\tau$, values which represent the period of travel of the waves reflected at the various reflectors.

The method permits fractionation of the energy sent into the ground for a given measurement, while permitting very efficient localization of the various reflectors.

The principal problem to be solved in carrying this method into effect is that of obtaining the best definition of the maxima of the correlation function. It is necessary to select an integration time $T$ that is of sufficient length to reduce the extent of the noise in relation to the amplitude of these maxima. It is also necessary to select an emission time function $f(t)$ of the waves by the source that is in itself well suited for obtaining the maxima indicated. A simple example illustrates this.

If the function $f(t)$ is reduced to a single impulse, the function $g(t)$ will comprise a corresponding single impulse, mixed with the noises, and the correlation function $k(T, \tau)$ as defined above, will have a single peak corresponding to the time $\tau$, for travel of the impulse reflected by the reflector $R_1$.

If the function $f(t)$ is formed of two impulses of substantially equal amplitude, the signal received representing $g(t)$ comprises two corresponding impulses separated by the same interval of time $\delta$. The correlation function will have a maximum amplitude peak for the time $\tau_1$ and two peaks of lesser amplitude corresponding to the times $\tau_1+\delta$ and $\tau_1-\delta$.

This explains the fact that, in determining the correlation function of a transmitted signal and of the signal received, there can be seen, at the sides of a maximum of this function for a dephasing $\tau_1$ resulting from a reflector $R_1$, secondary peaks or lobes, also known as correlation residues, which are less pronounced than the maximum and which are on either side of the latter, but which are not mixed with the ground noise residues. The presence of these secondary peaks or lobes is undesirable since there is a risk of their being thought to be other maxima of the correlation function coming from reflections of the transmitted waves on reflectors $R_2, R_3$ which are deeper than $R_1$, and the amplitudes of which are consequently attenuated.

The magnitude of the secondary lobes depends upon the form of the time function $f(t)$, and it is desirable to select the function $f(t)$ and to bring it into effect during a time $T$ such that the secondary lobes of the intercorrelation function $K(T,\tau)$ with $g(t)$ are not distinguished from the noise in the signal received; that is to say that, in practice, they are of an amplitude which will be fixed, for example, at a value less than one-tenth of that of the maximum amplitude peak. Determination of the time function $f(t)$ and of the time $T$, with a view to meeting these conditions, is based on the calculation of its autocorrelation function $h(T,\tau)$, defined thus:

$$b(T, \tau) = \int_{t=0}^{t=T} f(t)f(t+\tau)dt$$

This function has a maximum for when $\tau=0$, and when it is determined it becomes possible to compare the amplitude of the secondary peaks or lobes with that of the maximum peak.

Having recalled the above as regards the treatment of information received, it should be mentioned that methods involving long sinusoidal trains of closely spaced impulses of varying frequency are sometimes difficult to produce in practice and require complicated equipment for generating mechanical waves, which makes the equipment expensive and delicate.

A long signal method, which is described in U.S. Pat. Specification No. 3,326,320 (Forester) has also been proposed in which discrete impulses of variable and generally diminishing amplitude are transmitted into the ground. A first sequence of impulses is transmitted and the resultant first signal is recorded; then a second sequence of impulses is transmitted, a second resultant signal recorded, and the sign of the latter is inverted. The second signal, thus inverted, is added to the first resultant signal and the sum of these two signals is intercorrelated with the signal transmitted.

A method of this type offers certain advantageous over the conventional long signal methods, it being apparently simpler to carry into effect. However, the transmission of mechanical impulses of variable amplitude to give good reproducibility involves problems, since good reproducibility is essential for obtaining a favorable intercorrelation function.

Furthermore, this method requires two listening times for each transmission cycle. Also, the operation of processing the signals by this method is complex since it is necessary, in addition to the intercorrelation, difficult in itself, also to carry out the operations of inversion, rephasing and addition of the signals.

The present invention aims at providing a method of seismic prospecting using the transmission of energy between at least two points in the area under examination, the method being particularly applicable to seismic prospecting at sea and enabling the above-mentioned drawbacks to be reduced. The method is capable of being carried into practice in a simple manner both as regards the transmission of the energy waves and the utilization of the signals received.

For this purpose, an object of the invention is to provide a seismic prospecting method which comprises transmitting into the ground a long signal which is propagated in the form of waves which are picked up and recorded in the form of signals after having been reflected on at least one reflector, the signals received then being intercorrelated (or cross-correlated) with a function of the signal transmitted with a view to determining the period of travel of the reflected waves. In this method the long signal which is transmitted is constituted by a series of discrete elementary energy impulses of the same sign and of substantially constant amplitude, the number of impulses in the series and the intervals of time separating them being so selected that the function of autocorrelation of the signal transmitted has correlation residues the amplitude of which is less than a given fraction of the maximum amplitude of this function.

With this method, it is expedient to carry out the correlation of the signals received not with the transmitted signal itself, but with a signal obtained by locating unitary impulses at the moments at which energy impulses are transmitted. This method can be used by producing a series of impulses of substantially constant amplitude governed by the rate of chance occurrence of the impulses. Furthermore in one interesting form of carrying the method into effect, the energy impulses are created by sparks produced in the water between electrodes which are intermittently subjected to a high voltage by a release means controlled by the unwinding of a recorded graph.

In theory, there is a large number of different kinds of long signals that can be used for carrying out the correlation methods, and numerous generators of correlation functions have been designed for determining them. The exploration techniques employing correlation of signals are, in fact, employed in many fields other than that of geophysical prospecting.

The present invention includes selecting the particular type of long signal, defined above, for use in seismic prospecting. As will be explained below, this choice results from theoretical considerations on the use of long signals, but, above all, from practical considerations, relating, in particular, to the energy and frequency range necessary for transmitting waves into the earth, and to the technical characteristics of the transmitters.

The invention also includes the provision of apparatus for carrying the above method into effect.

The following explanations of the method that has just been defined will be given with reference to the accompanying drawings, in which:

FIGS. 2, 3, 4, 5, 5a, 5b, 5c, 5d and 6 are traces showing signals, occurring during the carrying out of the invention, and phases in their treatment.

FIG. 1 illustrates a conventional arrangement for undersea seismic prospecting, in which a transmitter E is towed by a prospecting vessel P, the transmitter trailing a certain number of mechanical wave receivers, or geophones, for recording the signals received.

Figure 1:
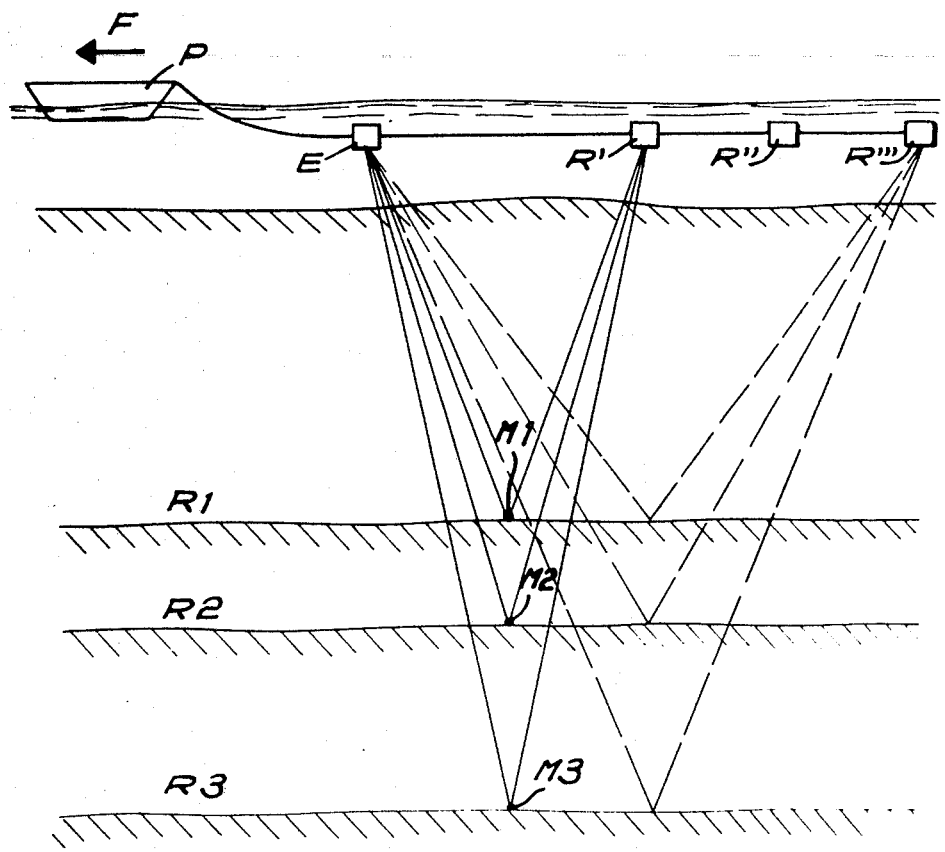
FIG. 1 is a schematic illustration of the principle of undersea seismic prospecting.

The transmitter E sends out mechanical waves which are propagated in the seabed and certain components of which are reflected at the mirror points $M_1$, $M_2$, and $M_3$ by the reflectors $R_1$, $R_2$, and $R_3$ respectively, and they are picked up by the receiver $R'$, which is located at a known fixed distance from the emitter.

When the transmitter E sends a signal of predetermined duration T, a listening period begins at the receivers $R'$, $R''$ and $R'''$, the duration of which period is the period $T$ of the transmitted signal plus a period $\theta$, equal to the travel time in the sea and seabed of the waves reflected by the deepest reflector $R_3$.

In the method of transmitting series of impulse in accordance with the invention, the signal sent out into the seabed is a long signal; this means in particular that it comprises several impulses during the duration of a given listening period; in general, the emission of this signal is controlled by the unwinding of a magnetic tape carrying a recording. This delivers an electric signal which controls an impulse-generator constituting the transmitter. The electric control signal is such a succession of voltage or current peaks and between them a null voltage or current, duration of which are unequal and nonrepetitive. Voltage or current peaks are of constant amplitude and same sign. This electric control signal may be written in form of a time function $f(t)$. In such a function, which controls emitter, peaks are ignition moments and null signals are silent times. Silent times are determined with a great accuracy, being all unequal and nonrepetitive. Each peak is a Dirac function.

The impulse-generator is, for example, a gas gun of known design, or a high-speed underwater spark-generator, often known as a "rapid sparker" and of a type similar to that described, for example, in French Patent Specification No. 1,560,237, filed on Dec. 28, 1966. Each impulse sent through the water causes a shock which is propagated through the seabed, which shock is made up of mechanical waves having a certain frequency range.

These impulses are controlled by peaks, of equal amplitude of the control signal (values 1 of the function $f(t)$). The amplitude of the impulses emitted, such as those from sparks in the case of a sparker, is not generally strictly constant and can vary from a mean value because of the poor reproducibility of the phenomena occuring in the production of a relatively large energy impulses by means of the normal generators. This is the reason why the amplitudes of the emitted impulses by means of the normal generators. This is the reason why the amplitudes of the emitted impulses can only be referred to as being substantially constant. On the other hand, mechanical wave generators control the release of impulses of predetermined moments with very great precision, and this makes it possible to produce a series of discrete impulses separated by intervals of time, the succession of which very closely follows the function $f(t)$ governing the control signal.

As regards the energy of the transmitted impulses, the very idea of transmitting discrete impulses, in contrast to the transmission of trains of very closely spaced impulses, the variable frequency envelope of which is used, implies that the energy used for creating each impulse lies somewhere between the energy of the conventional long signal methods on the one hand and that of the conventional impulse methods on the other.

In fact, to reach a reflector situated at a given depth and to collect usable information with the help of the reflected signals, it is necessary to use a certain overall energy W. This can be produced instantaneously, as in the heavy impulse methods employing explosives, or in several stages by means of successive impulses. In the case of the long signal methods, the greater the number of impulses in a given listening time, the lower can be the energy of each of these impulses. The energy of the discrete impulses utilized in the present method is approximately 10 times greater than that of trains of variable-frequency impulses or preselected frequency spectrum, as used in the known methods. To be more precise in the case where these discrete impulses are electric sparks, the electrical energy used for producing them lies between 100 and 100,000 Joules and, preferably, between 500 and 10,000 Joules.

With a long signal transmitter, of the type just defined, in a prospecting system as shown schematically in FIG. 1, whereby the presence of three reflectors $R_1$, $R_2$ and $R_3$ at progressively greater depths can be detected, the method of processing the signals received by a receiver such as $R'$ is as follows.

FIG. 2 illustrates the variations in a controlled signal governed by the function $f(t)$ and formed from a series, of duration $T$, of discrete peaks of equal amplitude $a1$, $a2$, $a3$, $a4$, $a5$ and so on. In the following, it is assumed that the autocorrelation function of $f(t)$ provides amplitude correlation residues which are negligible as compared with the central peak. The control signal causes the emission of a series of discrete impulses $b1$, $b2$, $b3$, $b4$, $b5$ and so on, which are illustrated in FIG. 3 and which have substantially equal amplitudes.

FIG. 4 illustrates schematically, as a function of time and disregarding the noise, the signal received by a receiver, such as $R'$, when the transmitter E has sent out a single impulse $b$ similar to those of FIG. 3; this signal comprises three successive reflections $c$, $d$, and $e$, the amplitudes of which become progressively attenuated and correspond to the responses of the three reflectors $R_1$, $R_2$, and $R_3$.

FIG. 5 illustrates the start of the complex signal, having a duration $T$ plus $\theta$, which is received and recorded by the receiver $R'$ after the transmission of the series of discrete impulses $b1$, $b2$, $b3$, $b4$, $b5$ and so on of FIG. 3, each of these impulses producing at the reception point three peaks similar to $c$, $d$, and $e$, respectively, of FIG. 4. Thus, the reflections at the reflector $R_1$ of the waves set up by the impulses illustrated in FIG. 3 have resulted in peaks $c_1$, $c_2$, $c_3$, $c_4$, $c_5$ and so on. The same applies in the case of the peaks $d_1$, $d_2$, $d_3$, $d_4$, $d_5$ and so on, and $e_1$, $e_2$, $e_3$, $e_4$, $e_5$, etc., the signal received corresponding to the superimposition of the time spreads of these three categories of peaks. In practice this signal also comprises noises of uncertain amplitude which partly or totally mask the peaks of FIG. 5.

The operation of intercorrelating the control signal of FIG. 2 (function $f(t)$) and the signal received, as shown in FIG. 5, can be reduced in diagrammatic terms, to causing the graph of fig 2, originating at A, to move from left to right before that of FIG. 5 starting at the origin 0 of the listening time; in each relative position of the two graphs, the corresponding ordinates of these two graphs are multiplied and the products obtained over the duration of the period $T$ are totaled; this amounts to adding the amplitudes of the peaks of FIG. 5, which are located at the same abscissa as a peak in the graph of FIG. 2. The result of this addition is shown on the Y-axis of the graph of FIG. 6, wherein the X-axis relates to the value $\tau$ of the phase-shift between the origins 0 and A of the two graphs for each of their relative positions.

FIGS. 5a, 5b, 5c and 5d show four positions of the graph of FIG. 2 in relation to the graph of FIG. 5, the phase-shift values 0A and 0, $\tau_1$, $\tau_2$, and $\tau_3$ respectively. In the position in FIG. 5a, it has been assumed that no peak $a_1$, $a_2$, $a_3$, etc., was present opposite a peak in the graph of FIG. 5; the result of the preceding addition operation is zero and corresponds to the start of the period, is fixed by the position of the maximum for the autocorrelation function of the control signal (FIG. 2).

In the position in FIG. 5b, all the peaks $a_1$, $a_2$, $a3$ and so on are opposite a peak in FIG. 5, the amplitude of which is at least equal to that of the peaks $c_1$, $c_2$, $c_3$, $c_4$, $c_5$, etc. This is so because this position is defined by a phase-shift $OA=\tau_1$ corresponding to the travel period of the waves set up by the impulses $b_1$, $b_2$, $b_3$ and so on of FIG. 3, for reaching the receiver R' after being reflected on the reflector $R_1$. The total $T$ of the amplitudes of all these peaks, of a value at least equal to the sum of the amplitudes of the peaks $c_1$, $c_2$, etc. which are shown on the Y-axis in FIG. 6, corresponds to a maximum for the intercorrelation function, the variation of which is shown in this FIG. 6, none of the previous positions on the graph of FIG. 2, which unwinds, being capable of providing such coincidence in the peaks of the two graphs; measurement of its abscissa $\tau_1$ enables the depth of the mirror point $M_1$ of the reflector $R_1$ (FIG. 1) to be ascertained. The intercorrelation function of FIG. 6 again shows two amplitude of maxima B and E, the abscissae $\tau_2$ and $\tau_3$ of which enable the depths of the mirror points $M_2$ and $M_3$ of the reflectors $R_2$ and $R_3$ to be determined and correspond to the positions shown in FIGS. 5c and 5d of the graph of FIG. 2, unwinding before that of FIG. 5, when the intercorrelation function is being calculated.

It is found that in the method that has just been described, the calculation of the intercorrelation function is clearly simplified and corresponds substantially to a rephasing of certain components of the received signal relatively to the emitted signal, i.e., it is a "reduced correlation" operation.

So far, no account has been taken of the problem of minimizing the residues the magnitude of which depends upon the number of impulses of the signal transmitter during the period $T$ and the speed at which these impulses follow each other; the relative amplitudes of the correlation residues can be calculated with the help of the autocorrelation function of the function $f(t)$.

If each impulse of the control signal obeying $f(t)$ has, conventionally, an amplitude of the value 1 the maximum of the autocorrelation function of $f(t)$ is equal to the number of impulses. When the function is dephased relatively to itself by an amount $\tau$, the number of impulses that will coincide will be equal to the number of impulses remote from this value $\tau$ in the origin function $f(t)$. Thus, if a low for the occurrence of the impulses has be en chosen such that there are never more than two impulses remote from a given interval $\tau$, the maximum value that the function will be able to assume beyond the value at coincidence, that is to say for when $\tau=0$, is 1. Thereafter, a sufficient number of impulses enables the relative value of the correlation residues to be reduced.

It has been found that a rate for the chance occurrence of the impulses enables the condition set forth above to be approximated in a satisfactory manner and for a favorable autocorrelation function to be obtained. In practice, it is possible to obtain, for example, series of impulses consistent with such a low, by causing the impulses to follow each other at unequal intervals of time, these being multiples of one basic time, these durations being added to a constant time, thus giving intervals of time between two impulses, the multipliers being selected in a chance sequence. By suitably selecting the number of impulses in the series, it will be possible to establish a relationship between the maximum of the autocorrelation function and of the correlation residue over the range 10 to 50, according to requirements.

The following examples will clearly show the method applied in undersea prospecting employing a spark-generator.

Use is made of a sparker which is cable of providing 10 kw. at 20 kv. and which produces discharges of 1,000 Joules, approximately. The sparker control program is arranged as follows:

The time between two sparks is fixed at $(20+2x)$ milliseconds, $x$ being a figure between 1 and 100.

The figure 1 to 100 are distributed in a chance manner, this giving an almost infinite series of numbers. The first 400 numbers obtained are taken. The time sequence corresponding to these 400 figures is obtained and this gives periods of silence ranging from 20 to 220 milliseconds, the duration of the sequence being approximately 48 seconds. This time is considerable compared with the longest travel time of mechanical waves in the ground (4 seconds for example).

The defined function $f(t)$ is autocorrelated by applying an elementary impulse at the end of each time interval contained within the range 20 to 220 milliseconds.

The autocorrelation function has a central peak, the amplitude of which is greater than 10 times the amplitude of the correlation residue. There is prepared a magnetic tape having a graph at the end of each elementary time interval.

The sparker is controlled with the help of this tape, and functions at a mean frequency, emitting 400 impulses in 48 seconds, and the electrical signals, provided by the receivers or geophones which number 24, are put on to a 25-track magnetic tape. Thus, the signals received by the geophones are each passed to a track of the magnetic tape, the remaining 25th track recording the series of control impulse transmitted to the spark generator, that is to say the long control signal itself.

To make use of the signals received, the autocorrelation function of the control signal is first determined by correlating therewith the record on the 25th track; the maximum of this function has the origin of the listening period (point B of FIG. 6) for the abscissa. The 24 intercorrelation functions of the signal emitted are then determined with the 24 recorded signals by repeating the operation of multiplying instantaneous and integration amplitudes for successive time shifts, having a value of 2 milliseconds, for example, of the 25th recording starting from the position of the latter that has furnished the maximum for the autocorrelation function ($\tau=0$).

A single maximum is obtained by a geophone if there is only one reflector, all the stray signals emanating from the autocorrelation residue having a height less than one-tenth of this signal.

In the case of several reflectors, use is made of as many geophone maxima as there are reflectors, and these maxima are observed so long as their amplitude remains at least equal to one-tenth of the amplitude of the most pronounced maximum or to the maximum amplitude of the noise in the intercorrelation function.

Measurement of the time intervals separating the maximum or maxima of each intercorrelating function and the maximum for the autocorrelation function gives, for each geophone, the travel times of the waves reaching the reflector or reflectors.

It has been seen that, with a signal transmitted in the manner described, a transmission time of 48 seconds made it possible to obtain a ratio of approximately 10:1 between the amplitudes of the maximum peak and of the correlation residues of the autocorrelation function of the signal.

This ratio can be increased by extending the duration of the signal, but it is also possible, using a given ratio, to reduce the period during which this signal is emitted by increasing the number of different intervals possible between the impulses, that is to say, it is also possible to interpose intervals between successive impulses of a duration less than 20 milliseconds and greater than 220 milliseconds.

The method of the invention offers the advantages of exploration methods using long signals, particularly as regards the possibility of good definition of the reflectors when the acoustic wave source is displaced, this being the case particularly in undersea prospecting. The method combines these advantages with those of the conventional impulse methods, which are easier to carry into effect. Nevertheless, as compared with these latter, the high fractionation of the total energy transmitted for each sequence as a result of the large number of impulses comprised therein is a factor favoring the obtaining of a good output in mechanical energy from the generators employed. Furthermore, high-energy transmissions create mechanical shocks which are characterized by many low frequencies and which are therefore represented by wide seismic impulses, this adversely affecting resolution in the final recording of two adjacent reflectors.

In essence, the advantage conferred by this method, as compared with other known methods, resides in the use of impulses of substantially constant amplitude. In fact, in theory it is possible to obtain with variable-amplitude signals autocorrelation functions that are very satisfactory as regards the relative amplitudes of the correlation residues in relation to the maximum amplitude peaks. Nevertheless, to benefit from this property on a practical basis, when effecting intercorrelation of the transmitted signal and the signals received, it is necessary that the amplitude of the impulses effectively transmitted into the seabed and passed to the receivers should precisely correspond to the amplitude of the impulses of the control signal, which is generally of an electrical nature. This correspondence is difficult to achieve practically in situ using known impulse generators, whether these be gas guns, spark-generators or implosion devices; two acoustic impulses controlled by two signals of the same amplitude can have different amplitudes; the results obtained in carrying out the intercorrelation are adversely affected to a marked extent, the more so the fewer the number of impulses transmitted.

Furthermore, with variable-amplitude signals, determination of the intercorrelation function requires multiplication of the instantaneous amplitudes of the signals transmitted and received before their integration for each time-shift value, $\tau$, and calls for complicated equipment for the purpose.

This does not however apply in the case of the method of the invention in which the amplitudes of the impulses of the control signal are equal and the impulses are transmitted in increased numbers; the differences in amplitude in the acoustic impulses transmitted through the seabed tend to offset their effects at the moment of correlation. The latter is no longer in fact a true intercorrelation operation with multiplication of the amplitudes, but a simple rephasing, with addition, of the reflected signal corresponding to a given reflector, in relation to the signals transmitted. It is in fact a reduced correlation operation in which the chance differences in the amplitude of the acoustic impulses actually transmitted tend to offset their effects by being added together; on the other hand, this operation can be carried out with equipment that is considerably simpler than the usual correlators.

Thus, there is obtained, in a simple manner, a rate for the occurrence of the transmitted impulses having a favorable autocorrelation function, thanks to the chance distribution of the intervals between these impulses.

We claim:

1. Seismic prospecting by correlated waves comprising the steps of:

transmitting into the ground a long signal, constituted by a series of distinct elementary energy pulses of the same sign and of substantially constant energy, and separated by unequal and nonrepetitive short intervals of time, the series of pulses being such that the autocorrelation function of the signal transmitted presents harmonic contents of correlation whose amplitude is lower than a given fraction of the maximum amplitude of this function;

detecting and recording, successively, after reflection from reflectors, each distinct energy signal;

producing a function of the time which takes the value 1 at each instant when an energy pulse is transmitted and remains zero the rest of the time;

intercorrelating the signals received with said function of the time for the purpose of determining the travel time of the signals reflected from reflectors; and measuring the travel times from the maximum of the autocorrelation function of the transmission function.

2. Seismic prospecting using correlated waves according to claim 1, wherein the series of energy pulses of substantially constant amplitude is governed by a law of random appearance of these pulses, said pulses being produced by a spark generator.

3. Seismic prospecting by correlated waves according to claim 2, wherein the intervals of time separating the appearance of two successive pulses of a series are multiples of the same base time to within about a fixed time, the series of multipliers being a random series of numbers.

* * * * *